US011687799B1

(12) United States Patent
Kumar et al.

(10) Patent No.: US 11,687,799 B1
(45) Date of Patent: Jun. 27, 2023

(54) INTEGRATED MACHINE LEARNING AND RULES PLATFORM FOR IMPROVED ACCURACY AND ROOT CAUSE ANALYSIS

(71) Applicant: INTUIT INC., Mountain View, CA (US)

(72) Inventors: Sricharan Kallur Palli Kumar, Fremont, CA (US); Conrad De Peuter, Mountain View, CA (US); Efraim David Feinstein, San Jose, CA (US); Nagaraj Janardhana, Cupertino, CA (US); Yi Xu Ng, Berkley, CA (US); Ian Andrew Sebanja, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/815,744

(22) Filed: Jul. 28, 2022

(51) Int. Cl.
*G06N 5/025* (2023.01)

(52) U.S. Cl.
CPC .................. *G06N 5/025* (2013.01)

(58) Field of Classification Search
CPC ..................................... G06N 5/025
See application file for complete search history.

(56) References Cited

U.S. PATENT DOCUMENTS

| | | | |
|---|---|---|---|
| 7,636,697 B1* | 12/2009 | Dobson | G06N 20/00 706/12 |
| 10,824,420 B2* | 11/2020 | Collins | G06F 8/10 |
| 11,010,658 B2* | 5/2021 | Koren | G06N 3/0454 |
| 11,288,589 B1* | 3/2022 | Naveh | G06F 30/337 |
| 11,373,114 B1* | 6/2022 | Naveh | G06N 10/20 |
| 11,443,198 B1* | 9/2022 | Chen | G06N 5/022 |
| 2005/0015217 A1* | 1/2005 | Weidl | G05B 17/02 702/185 |
| 2005/0043922 A1* | 2/2005 | Weidl | G06N 5/04 702/183 |

(Continued)

OTHER PUBLICATIONS

Game Theoretic Analysis of the Slurm Scheduler Model Ticona (Year: 2020).*

(Continued)

*Primary Examiner* — Brian M Smith
*Assistant Examiner* — Ababacar Seck
(74) *Attorney, Agent, or Firm* — Patterson + Sheridan, LLP (57) ABSTRACT

Aspects of the present disclosure provide techniques for machine learning and rules integration. Embodiments include receiving input values corresponding to a subset of a set of input variables associated with an automated determination. Embodiments include generating a directed acyclic graph (DAG) representing a set of constraints corresponding to the set of input variables. The set of constraints relate to one or more machine learning models and one or more rules. Embodiments include receiving one or more outputs from the one or more machine learning models based on one or more of the input values. Embodiments include determining outcomes for the one or more rules based on at least one of the input values. Embodiments include populating the DAG based on the input values, the one or more outputs, and the outcomes. Embodiments include making the automated determination based on logic represented by the DAG.

17 Claims, 5 Drawing Sheets

(56) References Cited

U.S. PATENT DOCUMENTS

| | | | | |
|---|---|---|---|---|
| 2005/0049988 A1* | 3/2005 | Dahlquist | .......... | G05B 23/0278 706/46 |
| 2008/0114581 A1* | 5/2008 | Meir | .................. | H04L 41/0631 703/13 |
| 2013/0326475 A1* | 12/2013 | Gulwani | ................. | G06F 40/12 717/107 |
| 2016/0063209 A1* | 3/2016 | Malaviya | ............... | G16H 50/50 706/12 |
| 2016/0196374 A1* | 7/2016 | Bar | ......................... | G06F 11/36 703/2 |
| 2018/0165604 A1* | 6/2018 | Minkin | .................. | G06Q 10/06 |
| 2019/0042911 A1* | 2/2019 | Koren | .................... | G06N 7/005 |
| 2020/0081882 A1* | 3/2020 | Cheriton | ............. | G06F 16/9024 |
| 2020/0250566 A1* | 8/2020 | Majumdar | .......... | G06F 9/45504 |
| 2021/0026314 A1* | 1/2021 | Phan | .................. | G05B 13/0265 |
| 2021/0342548 A1* | 11/2021 | Galitsky | ................. | G06F 40/30 |
| 2021/0365817 A1* | 11/2021 | Riegel | .................... | G06N 5/042 |
| 2021/0374886 A1* | 12/2021 | Reitz | .................... | G06K 9/6259 |
| 2022/0222559 A1* | 7/2022 | Naveh | ................... | G06N 5/003 |

OTHER PUBLICATIONS

A DAG-Based Forwarding Paradigm for Large Scale Software Defined Networks Avallone et al. (Year: 2020).*

A Layered Software Architecture for Quantum Computing Design Tools Svore et al (Year: 2006).*

Parameterized quantum circuits as machine learning models Benedetti et al. (Year: 2019).*

A Neural Framework for Learning DAG to DAG Translation Kaluza et al. (Year: 2018).*

* cited by examiner

INTEGRATED MACHINE LEARNING AND RULES PLATFORM FOR IMPROVED ACCURACY AND ROOT CAUSE ANALYSIS

INTRODUCTION

Aspects of the present disclosure relate to techniques for a platform that integrates machine learning and rules in order to provide a high level of accuracy and to enable effective root cause analysis.

BACKGROUND

Every year millions of people, businesses, and organizations around the world use software applications for a wide variety of purposes. Software applications involve many decisions that are made based on different types of logic. For example, some software applications apply rules in order to determine actions to take. Other software applications rely on machine learning techniques to assist with decision-making.

In many cases, the complex logic utilized by an application may be difficult to audit, and it can be challenging to determine which aspects of the logic should be adjusted when incorrect results or errors are produced. Furthermore, developing software applications with various types of logic can be inefficient due to separate processes and costs associated with planning, writing, testing, and debugging independent application components.

As such, there is a need in the art for improved software applications that overcome the issues identified above.

BRIEF SUMMARY

Certain embodiments provide a method for machine learning and rules integration. In one embodiment, a method includes: receiving a plurality of input values corresponding to a subset of a set of input variables associated with an automated determination, wherein the subset does not include at least one input variable from the set of input variables; generating a directed acyclic graph (DAG) representing a set of constraints corresponding to the set of input variables, wherein the set of constraints relate to: one or more machine learning models; and one or more rules; providing one or more inputs to the one or more machine learning models based on one or more input values of the plurality of input values; receiving one or more outputs from the one or more machine learning models based on the one or more inputs; determining outcomes for the one or more rules based on at least one input value of the plurality of input values; populating the DAG based on the plurality of input values, the one or more outputs from the one or more machine learning models, and the outcomes for the one or more rules; making the automated determination based on logic represented by the DAG; and performing one or more actions based on the automated determination Other embodiments provide a method for machine learning and rules integration. In one embodiment, the method comprises: receiving, from a user via a user interface, a plurality of input values corresponding to a subset of a set of input variables associated with an automated determination, wherein the subset does not include at least one input variable from the set of input variables; generating a directed acyclic graph (DAG) representing a set of constraints corresponding to the set of input variables, wherein the set of constraints relate to: one or more machine learning models; and one or more rules; providing one or more inputs to the one or more machine learning models based on one or more input values of the plurality of input values; receiving one or more outputs from the one or more machine learning models based on the one or more inputs; determining outcomes for the one or more rules based on at least one input value of the plurality of input values; populating the DAG based on the plurality of input values, the one or more outputs from the one or more machine learning models, and the outcomes for the one or more rules; making the automated determination based on logic represented by the DAG; providing information for display to the user via the user interface based on the automated determination; receiving, from the user via the user interface, feedback relating to the information; and making a subsequent automated determination based on the feedback.

Other embodiments provide: an apparatus operable, configured, or otherwise adapted to perform the aforementioned method as well as those described elsewhere herein; a non-transitory, computer-readable media comprising instructions that, when executed by a processor of an apparatus, cause the apparatus to perform one or more of the aforementioned methods as well as those described elsewhere herein; a computer program product embodied on a computer-readable storage medium comprising code for performing one or more of the aforementioned methods as well as those described elsewhere herein; and an apparatus comprising means for performing one or more of the aforementioned methods as well as those described elsewhere herein. By way of example, an apparatus may comprise a processing system, a device with a processing system, or processing systems cooperating over one or more networks.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure relate to machine learning and rules integration.

In certain embodiments, machine learning models and rules are integrated within a single, unified platform. For example, as described in more detail below with respect to FIG. 1, a software application may include logic that is based on both the use of machine learning models and the evaluation of rules in an integrated manner such that outputs of rules may be inputs to machine learning models and vice versa.

Furthermore, integrated machine learning and rules based logic may be represented in a directed acyclic graph (DAG) for improved analysis, auditability, and dynamic improvement of application logic. For example, as described in more detail below with respect to FIG. 2, a DAG may be populated based on the rules and/or machine learning models used to make an automated determination. As described in more detail below with respect to FIG. 3, the DAG may enable an iterative feedback loop by which user feedback is used to modify rules and/or machine learning models for improved performance. For example, the DAG may be analyzed to determine a root cause of an incorrect result that is indicated in user feedback, and the root cause may be addressed through modification of one or more rules and/or re-training of one or more machine learning models based on the user feedback.

Machine learning models and training processes are described in more detail below with respect to FIG. 1. For example, a machine learning model may be trained through an iterative process by which parameters of the model are updated to produce improved results based on historical data. Rules may be expressions of fixed logic, through rules may be dynamically modified based on user feedback as described herein to produce improved results.

Embodiments of the present disclosure constitute many technical improvements with respect to conventional software application logic. For example, by utilizing an integrated platform for machine learning and rules, techniques described herein allow machine learning models and rules to function and improve symbiotically, such as by allowing results from machine learning models to inform rules and vice versa. Furthermore, by utilizing a DAG that represents machine learning and rules based logic used to make automated determinations, techniques described herein provide improved auditability, analysis, and iterative improvement, such as by analyzing the DAG to identify the source of an incorrect result and modifying rules and/or machine learning models accordingly. Embodiments of the present disclosure provide a feedback loop whereby user feedback is used to iteratively improve both machine learning models and rules, such as based on identification of optimal modifications through analysis of the DAG. Thus, techniques described herein provide improved performance compared to conventional techniques that do not involve the same level of integration of machine learning and rules and/or the same level of auditability and iterative improvement.

Furthermore, by integrating machine learning and rules into a unified platform, techniques described herein allow software applications to be developed more efficiently and to function more efficiently. For example, an integrated machine learning and rules platform reduces resources and costs that would otherwise be needed to separately develop, test, and maintain independent machine learning components and rules components of an application, as well as resources and costs associated with ensuring that independently developed components function together without issue. Furthermore, an integrated machine learning and rules platform allows for more efficient utilization of physical computing resources at runtime, such as by sharing common application framework and through fine-grained dynamically-informed selection of which components of machine learning logic and/or rules logic are to be executed for a specific purpose. For instance, rather than separately executing both machine learning logic and rules logic and then aggregating the independently-determined results, techniques described herein involve a unified logic path that avoids execution of logic that is not needed to make a particular determination (e.g., a given machine learning model may not need to be utilized if evaluating a related rule produces a particular outcome).

It is noted that, while embodiments are described herein with respect to particular types of machine learning models and particular types of rules, techniques described herein may also be employed in other contexts.

Example Computing Environment

Figure 1:
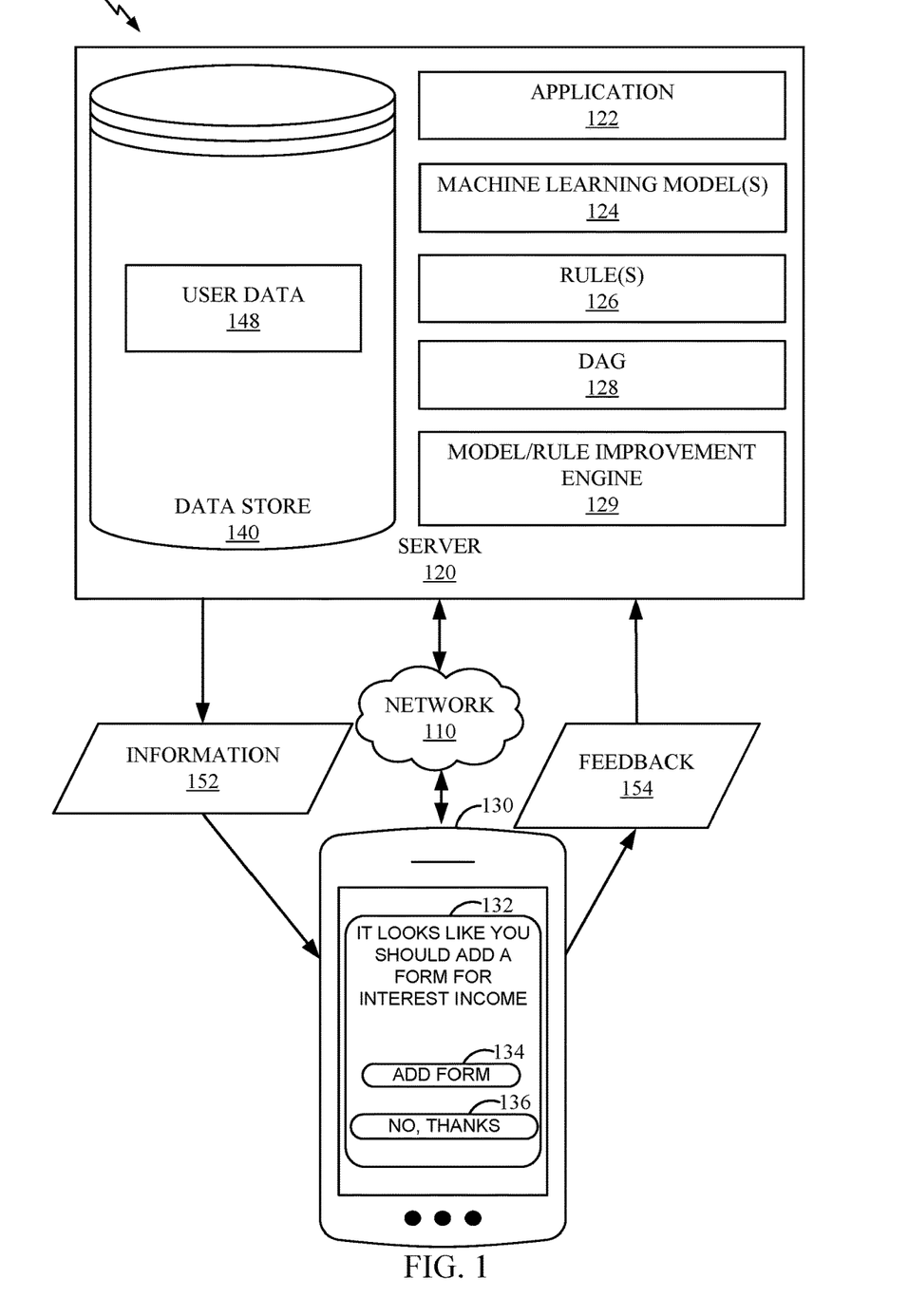
FIG. 1 depicts an example computing environment for machine learning and rules integration.

FIG. 1 illustrates an example computing environment 100 for machine learning and rules integration.

Computing environment 100 includes a server 120 and a client 130 connected over network 110. Network 110 may be representative of any type of connection over which data may be transmitted, such as a wide area network (WAN), local area network (LAN), cellular data network, and/or the like.

Server 120 includes an application 122, which generally represents a computing application that a user interacts with over network 110 via client 130. In some embodiments, application 122 is accessed via a user interface associated with client 130. In one example, application 122 comprises a financial management system that is configured to provide financial management services to a plurality of users.

According to one embodiment, application 122 is an electronic financial accounting system that assists users with tax return preparation or other financial accounting practices. Application 122 can be a standalone system that provides financial management services to users. Alternatively, the application 122 can be integrated into other software or service products provided by a service provider. In alternative embodiments, application 122 is not a financial management application, and performs other functions.

Application 122 may perform one or more aspects of machine learning and rules integration techniques described herein. For instance, application 122 may utilize one or more machine learning models 124 and/or one or more rules 126 to make automated determinations, such as whether to recommend a certain action or type of content to a user. More generally, application 122 may utilize machine learning techniques and rules in an integrated manner to determine whether to provide information 152 to client 130, such as based on user data 148. It is noted that while machine learning model(s) 124, rules 126, DAG 128, model/rule improvement engine 129, and data store 140 are depicted separately from application 122, one or more of these components may also be part of application 122.

Machine learning models 124 generally include one or more models that have been generated and/or trained using one or more of a variety of machine learning techniques.

Machine-learning models allow computing systems to improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, coefficient of drag, and engine displacement.

There are many different types of machine-learning models that can be used in embodiments of the present disclosure. For example, machine learning model(s) 126 may include one or more neural networks, classification models, support vector machines, Bayesian belief networks, regression models, deep belief networks, long short-term memory (LSTM) models, clustering models, or unsupervised models comprising vectors representing historical data for comparison, among others.

Neural networks, for example, generally include a plurality of connected units or nodes called artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network. In another example, a classification model may be a tree model (e.g., a decision tree) that makes a classification by dividing the inputs into smaller classifications (at nodes), which result in an ultimate classification at a leaf.

One or more machine learning models 124 may be trained using supervised learning techniques. In some embodiments, training a model involves providing training inputs to the model. The model processes the training inputs and produces outputs based on the training inputs. The outputs are compared to labels associated with the training inputs to determine the accuracy of the machine learning model, and parameters of machine learning model are iteratively adjusted until one or more conditions are met. For example, the conditions may relate to whether the predictions produced by the model based on the training inputs match the labels associated with the training inputs or whether a measure of error between training iterations is not decreasing or not decreasing more than a threshold amount. The conditions may also include whether a training interaction limit has been reached. Parameters adjusted during training may include, for example, hyperparameters, values related to numbers of iterations, weights, functions, and/or the like. In some embodiments, validation and testing are also performed for models, such as based on validation data and test data, as is known in the art. A given machine learning model 124 may be trained either through batch training (e.g., each time a threshold number of training data instances have been generated) or through online training (e.g., re-training the given machine learning model 124 with each new training data instance as it is generated). Thus, machine learning models 124 may be continuously improved through re-training as new feedback is received from users.

Once a machine learning model 124 is trained, it may be used to produce outputs that application 122 utilizes in making determinations. For instance, aspects of user data 148 may be used to provide inputs to a machine learning model 124. The machine learning model 124 may output a prediction or other type of data based on the inputs. For instance, a model may output a score indicating a likelihood of a certain condition being true. In some embodiments, the model outputs a prediction/inference and an explanation. The combination of the scores and explanations from the rules and models may be used to achieve a comprehensive understanding of why a system failed to produce a correct result. For example, techniques described herein allow back-tracking through the entire rules/models system based on the one or more rules (which are naturally explainable) and explanations output by one or more models.

In one example, a machine learning model 124 is trained (e.g., based on historical user data associated with indications of whether the historical user data was associated with a user that utilized a particular type of form) to predict whether a given user will utilize the particular type of form based on user data of the given user.

Rule(s) 126 generally include one or more logical expressions that are evaluated to determine outcomes. For example, a rule 126 may indicate that if one or more conditions are met then a certain result follows. In one particular example, a rule indicates that if a user is associated with an income value that exceeds a threshold then a particular type of form should be recommended to the user. Rule(s) 126 may be defined, for example, by software developers and/or users and, according to embodiments of the present disclosure, may be automatically adjusted based on user feedback and/or programmatic analysis.

Machine learning model(s) 124 and rule(s) 126 may integrated in a unified platform. In some embodiments, logic of application 122 involves dependencies between machine learning model(s) 124 and rule(s) 126. For example, a rule 126 may depend upon an output from a machine learning model 124 and/or an input to a machine learning model 124 may be based on a result of evaluating a rule 126. In one example, a machine learning model 124 may be used to predict a parameter on which a rule 126 depends.

A logical path involving one or more machine learning models 124 and one or more rules 126 may be used to make an automated determination, such as a determination to provide information 152 to client 130 for display to a user. For example, information 12 may include a recommendation to add a particular type of form to a tax return.

A window 132 is displayed within a user interface on client 130 based on information 152. Window 132 comprises a recommendation that the user should add a form for interest income (e.g., based on a result of applying one or more rules 126 and/or utilizing one or more machine learning models 124). Window 132 comprises a user interface control 134 that, when selected, initiates a process for adding the recommended form. Window 132 comprises another user interface control 136 that, when selected, allows the user to decline the recommendation. For instance, input provided by the user (e.g., via control 134 or control 136) may be sent as feedback 154 to server 120 for use in improving machine learning model(s) 124 and/or rule(s) 126, such as by model/rule improvement engine 129 based on directed acyclic graph (DAG) 128.

DAG 128 is generated based on machine learning model (s) 124 and rule(s) 126. For example, as described in more detail below with respect to FIG. 2, a DAG 128 may represent a logical flow that involves one or more machine learning models 124 and one or more rules 126 associated with one or more automated determinations. A DAG is a directed graph with no directed cycles, meaning that it consists of vertices and edges with each edge directed from one vertex to another such that following those directions will never form a closed loop.

DAG 128 may be used, such as by model/rule improvement engine 129, to analyze and improve machine learning model(s) 124 and/or rule(s) 126, such as based on feedback 154. For example, if feedback 154 indicates that an inaccurate or suboptimal determination was made by application 122 (e.g., if the user selected control 136 to decline a recommendation that was determined based on application logic), then model/rule improvement engine 129 may analyze DAG 128 to determine a potential cause of the inaccurate or suboptimal determination. For instance, DAG 128 may be used to identify which machine learning model(s) 124 and/or rule(s) 126 could have been responsible for the inaccurate or suboptimal determination.

Model/rule improvement engine 129 may take action to modify one or more machine learning model(s) 124 and/or rule(s) 126 based on its analysis of DAG 128 in view of feedback 154. For example, as described in more detail below with respect to FIG. 3, model/rule improvement engine 129 may adjust one or more rules 126, re-train one or more machine learning models 124 (e.g., with updated training data based on feedback 154), and/or modify dependencies between machine learning model(s) 124 and rule(s) 126, such as until the application logic produces a result consistent with feedback 154 (e.g., determining not to recommend adding a form for interest income) when given the same input values that were originally used to produce the inaccurate or suboptimal determination.

In a particular example, if model/rule improvement engine 129 determines that a rule 126 (specifying that a form for interest income should be recommended in any case where the user's wages exceed $500K) was responsible for an inaccurate or suboptimal determination, then the rule 126 may be modified such that the correct outcome is produced (e.g., changing the wage threshold so that the user's wages do not exceed the threshold). In another example, if model/rule improvement engine 129 determines that a machine learning model 124 (that predicts a user's wages based on some set of user attributes) was responsible for an inaccurate or suboptimal determination, then the machine learning model 124 may be re-trained such that the correct outcome is produced (e.g., re-training the model until it outputs a wage value below a particular threshold when given the set of user attributes). In yet another example, if model/rule improvement engine 129 determines that a dependency between a rule 126 and a machine learning model 126 (e.g., providing a predicted wage value output by a model as an input to a rule) was responsible for an inaccurate or suboptimal determination, then the dependency may be modified such that the correct outcome is produced (e.g., changing the dependency such that a predicted wage value output by the model is only used as an input to the rule if a confidence score for the prediction output by the model exceeds a threshold). Thus, techniques described herein provide a feedback loop by which machine learning model(s) 124 and/or rule(s) 126, as well as logical relationships between them, are continuously improved.

Data store 140 generally represents a data storage entity such as a database or repository that stores user data 148. User data 148 may, for example, include data related to one or more users of application 122, such as user attributes (e.g., length of use of the application, account type, historical records of user activities within application 122), data provided by the user during use of application 122 (e.g., financial information, forms, and/or the like), as well as other types of data related to users.

Client 130 generally represents a computing device such as a mobile phone, laptop or desktop computer, tablet computer, or the like. Client 130 is used to access application 122 over network 110, such as via a user interface associated with client 130. In alternative embodiments, application 122 (and, in some embodiments machine learning model(s) 124, rule(s) 126, DAG 128, model/rule improvement engine 129, and/or data store 140) is located directly on client 130 or on one or more separate devices.

It is noted that particular examples described herein, such as those related to tax preparation, are not limiting, and techniques described herein may be utilized with different types of software applications, different types of models and/or rules, and/or for different purposes.

Figure 2:
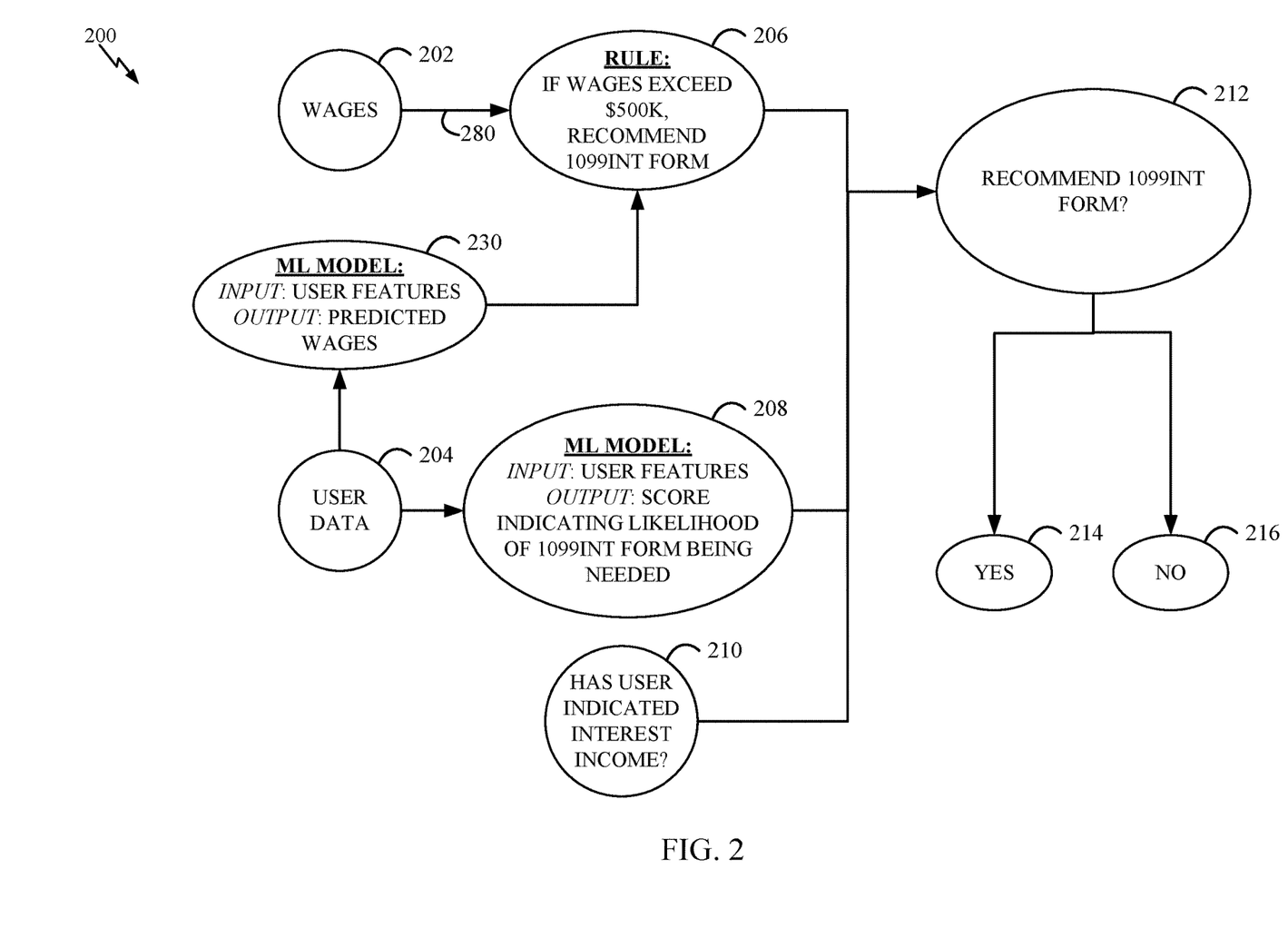
FIG. 2 depicts an example directed acyclic graph (DAG) related to machine learning and rules integration.

Example Directed Acyclic Graph (DAG) Related to Machine Learning and Rules Integration FIG. 2 depicts an example directed acyclic graph (DAG) 200 related to machine learning and rules integration. For example, DAG 200 may correspond to DAG 128 of FIG. 1.

DAG 200 comprises a plurality of nodes 202, 204, 206, 208, 210, 212, 214, 216, and 230, connected by a plurality of directed edges (e.g., edge 280). DAG 200 generally represents logic employed by an application, such as application 122 of FIG. 1, to make an automated determination, such as based on one or more machine learning model(s) 124 and/or rule(s) 126 of FIG. 1. In some embodiments, DAG 200 represents a set of constraints related to a plurality of variables, such as involving the use of models and/or rules to make a determination.

Node 202 represents a user's wages, which is a value provided as an input to node 206, which represents a rule that specifies that if wages exceed $500K then an interest income form (1099INT) should be recommended to the user. For example, the rule may have defined by a subject matter expert based on knowledge and/or analysis of historical data indicating that users with wages over $500k generally utilize an interest income form.

Node 204 represents some set of user data (e.g., user attributes) used to provide inputs to machine learning models represented by nodes 230 and 208. It is noted that while a single node 204 is depicted, a set of user data may be represented by a plurality of nodes representing a plurality of data points, and different subsets of the user data may be provided as inputs to different machine learning models.

The machine learning model represented by node 230 accepts inputs based on one or more user features of a user and outputs a predicted value for the user's wages. The output from the machine learning model represented by node 230 is used as another input to the rule represented by node 206. For example, if the user has not provided a value for wages (represented by node 202), then the user's wages may be predicted, and the predicted wages output by the model represented by node 230 may be used as the input to the rule represented by node 206.

The machine learning model represented by node 208 accepts inputs based on one or more user features of a user and outputs a likelihood that an interest income form (1099INT) will be needed by the user.

Node 210 represents a data point indicating whether the user has indicated that interest income will be reported, such as through input to the application. Outputs of nodes 206, 208, and 210 may all potentially be used as inputs to node 212, which represents a decision of whether to recommend an interest income form (1099INT) to the user. For instance, if node 210 specifies that the user has directly indicated interest income, then the decision at node 212 may be to recommend the interest income form (e.g., an outcome represented by node 214) regardless of outputs from any other nodes. Conversely, if node 210 specifies that the user has not directly indicated interest income, then the decision at node 212 may be based on outputs from nodes 206 and/or 208. If the output of node 206 indicates that an interest income form is to be recommended, then the decision at node 212 may be to recommend the interest income form. Conversely, if the output from node 206 indicates that the interest income form is not to be recommended, then the decision at node 212 may be not to recommend the interest income form (e.g., an outcome represented by node 216), or the decision may be based on output from node 208.

If the output of node 208 indicates a likelihood above a threshold, then the decision at node 212 may be to recommend the interest income form. Conversely, if the output of node 208 indicates a likelihood below the threshold, then the decision at node 212 may be not to recommend the interest income form, In some cases, the decision at node 212 is based on a combination of outputs from nodes 206, 208, and/or 210 (e.g., wherein weights are assigned to the outputs from the different nodes, such as based on confidence scores and/or configured values).

If the application logic represented by DAG 200 produces an incorrect result in a particular case (e.g., based on a particular set of inputs), as indicated in user feedback, then DAG 200 may be used to identify potential sources of the incorrect result so that one or more rules and/or models may be improved. In particular cases, DAG 200 may be populated based on particular inputs used to arrive at a determination. In one example, the user has not yet provided a wages value or directly indicated interest income. The model represented by node 230 is used to predict the user's wages based on attributes of the user, and the predicted wages are provided as an input to the rule represented by node 206. For instance, the predicted wages may be $450K, and the output of node 206 may be not to recommend a 1099INT form. The model represented by node 208 is used to determine a likelihood of a 1099INT form being needed by the user based on one or more attributes of the user. For example, the output of node 208 may be a likelihood of 82%. Thus, in this example, even though the outputs of nodes 206 and 210 indicate not to recommend a 1099INT form, the likelihood output by node 208 may exceed a threshold (e.g., 80% or higher) such that the decision made at node 212 is to recommend a 1099INT form, arriving at node 214. If user feedback indicates that the user does not in fact need a 1099INT form, then DAG 200 may be analyzed to determine that node 208 is the root cause of the incorrect outcome. Thus, the model represented by node 208 may be re-trained based on the user feedback such that it produces a likelihood below the threshold when provided with the same user attributes as inputs, thereby resulting in a decision at node 212 not to recommend a 1099INT form (e.g., arriving at node 216).

DAG 200 may be constructed based on constraints programmed into the application. When a decision is made based on a particular set of input data points, DAG 200 may be populated accordingly. For example, part of DAG 200 may be filled out based on the data points provided, and additional portions of DAG 200 may be filled using graph node and edge prediction techniques. In some embodiments, DAG 200 is backfilled iteratively over multiple rounds, with some backfill rounds depending on earlier backfill rounds. Backfilling a node generally involves solving an optimization problem. As more node values are filled using backfilling techniques, more optimization values are determined, which can be used during subsequent backfilling rounds. Once DAG 200 is backfilled, it may be solved (e.g., forward-solved) to output a combination of inputs that have been resolved and ranges/distributions for inputs that were not able to be resolved.

In another example of application logic (not depicted), an application is attempting to determine a user's complete document set and extracted values from individual documents. A user's wages are indicated in the user's W2 form, and can be used to inform correctness of an extraction of data from the user's 1099INT form. For example, if a user has made $20,000 in a year, it is highly unlikely that the user is also earning $20,191.00 of interest income, Thus, the confidence value for the extracted interest income value will be low based on the wages indicated in the user's W2. In another example, if a high level of 401k deductions is indicated on a user's W2 form, it is likely that the user is missing a 1099INT form. For example, if a 1099INT form is not provided by the user, a rule may specify that a 1099INT form should be requested from the user based on the user's W2 data. If a 1099INT form is provided, extracted values from the 1099INT can be used to improve confidence values of the data extracted from the user's W2.

Application logic such as that expressed above may be represented via a plurality of constraints, which may be used to generate a DAG. The DAG may then be used to analyze the application logic, particularly in cases where user feedback indicates that the application logic produced an incorrect result, such as to identify a model or rule that contributed to and/or was a root cause of the incorrect result.

Example Feedback Loop Related to Machine Learning and Rules Integration

Figure 3:
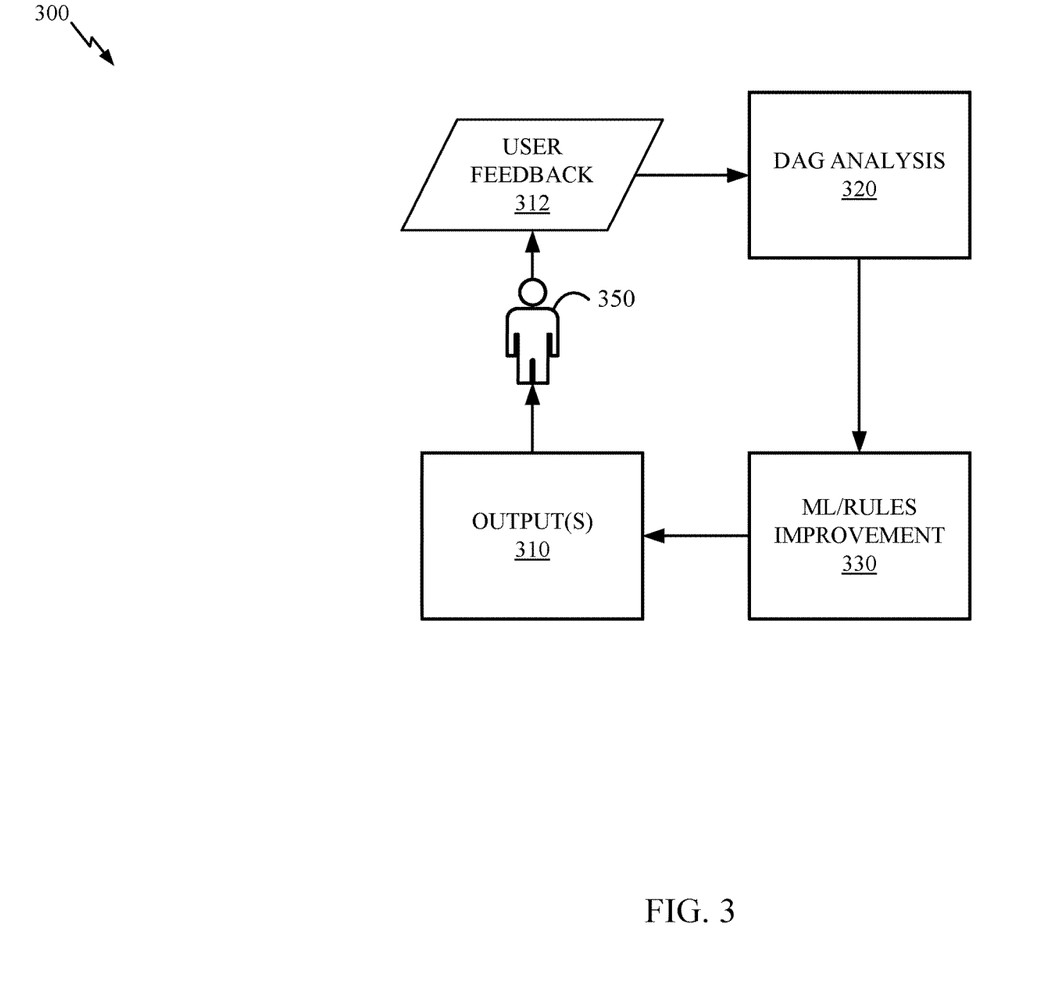
FIG. 3 depicts an example feedback loop related to machine learning and rules integration.

FIG. 3 is an illustration 300 of an example feedback loop related to machine learning and rules integration.

One or more outputs 310 from an application logic path are provided to a user 350 of the application, such as via a user interface (e.g., on client 130 of FIG. 1). User 350 provides user feedback 312 with respect to the one or more outputs 310, such as indicating an inaccurate or suboptimal result.

User feedback 312 is used to perform a DAG analysis 320, such as to identify one or more machine learning models and/or rules that contributed to and/or were a root cause of the inaccurate or suboptimal result indicated in user feedback 312.

For instance, DAG analysis 320 may involve analyzing DAG 200 of FIG. 2 in view of user feedback 312, and identifying a node representing a machine learning model or rule that was a root cause of the inaccurate or suboptimal result.

Machine learning and/or rules improvement 330 is performed based on DAG analysis 320. For example, machine learning and/or rules improvement 330 may involve modifying one or more machine learning models and/or rules, and/or logical relationships between one or more machine learning models and/or rules based on DAG analysis 320, such that the application logic no longer produces the inaccurate or suboptimal result.

The improved machine learning models and/or rules may be used to determine one or more subsequent outputs 310 that may be provided to user 350.

Thus, machine learning models, rules, and/or dependencies between machine learning models and rules may be continuously improved through a feedback loop in which user feedback is used to modify application logic for increased accuracy.

Example Operations for Machine Learning and Rules Integration

Figure 4:
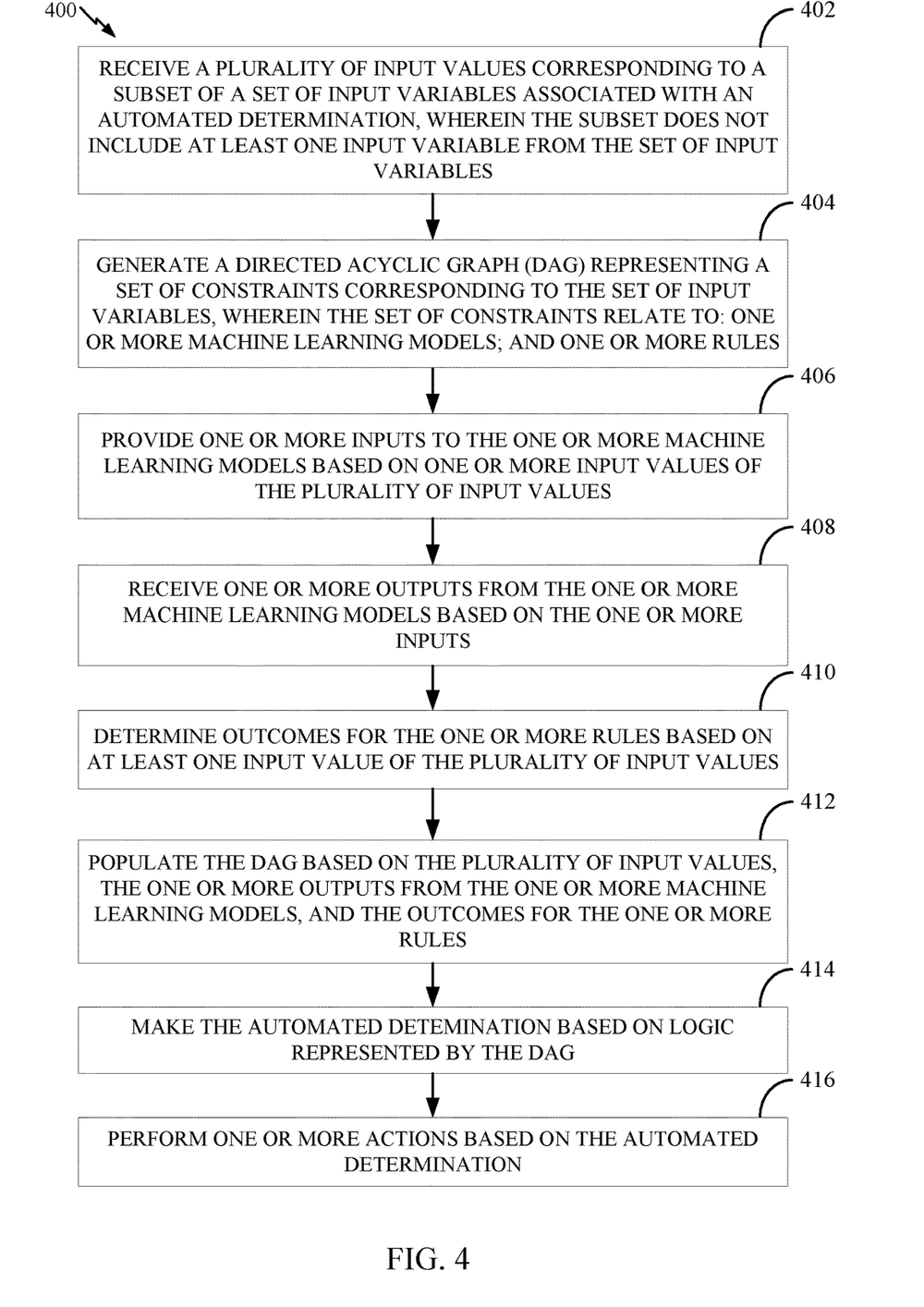
FIG. 4 depicts example operations related to machine learning and rules integration.

FIG. 4 depicts example operations 400 for machine learning and rules integration. For example, operations 400 may be performed by one or more components of server 120 and/or client 130 of FIG. 1, such as application 122 and/or model/rule improvement engine 129 of FIG. 1.

Operations 400 begin at step 402, with receiving a plurality of input values corresponding to a subset of a set of input variables associated with an automated determination, wherein the subset does not include at least one input variable from the set of input variables. In some embodiments, the plurality of input values are received via a user interface.

Operations 400 continue at step 404, with generating a directed acyclic graph (DAG) representing a set of constraints corresponding to the set of input variables, wherein the set of constraints relate to one or more machine learning models and one or more rules. In some embodiments, the DAG indicates one or more dependencies between the one or more machine learning models and the one or more rules.

Operations 400 continue at step 406, with providing one or more inputs to the one or more machine learning models based on one or more input values of the plurality of input values.

Operations 400 continue at step 408, with receiving one or more outputs from the one or more machine learning models based on the one or more inputs.

Operations 400 continue at step 410, with determining outcomes for the one or more rules based on at least one input value of the plurality of input values.

Operations 400 continue at step 412, with populating the DAG based on the plurality of input values, the one or more outputs from the one or more machine learning models, and the outcomes for the one or more rules. In some embodiments, populating the DAG comprises performing a series of iterations during which nodes of the DAG are backfilled. Certain embodiments further comprise forward-solving the DAG to determine one or more values for one or more resolved inputs and one or more ranges for one or more unresolved inputs.

Operations 400 continue at step 414, with making the automated determination based on logic represented by the DAG.

Operations 400 continue at step 416, with performing one or more actions based on the automated determination.

Some embodiments further comprise receiving feedback from a user related to the automated determination, and modifying a rule of the one or more rules or a machine learning model of the one or more machine learning models based on the feedback. For example, modifying the machine learning model may comprise re-training the machine learning model based on the feedback.

In some embodiments, the modifying is based on an analysis of the DAG in view of the feedback. For example, the analysis of the DAG may comprise determining a root cause of an incorrect determination that is indicated by the feedback.

Certain embodiments comprise providing information for display to the user via the user interface based on the automated determination, receiving, from the user via the user interface, feedback relating to the information, and making a subsequent automated determination based on the feedback (e.g., using one or more machine learning models and/or rules that were modified based on the feedback).

Example Computing Systems

Figure 5A:
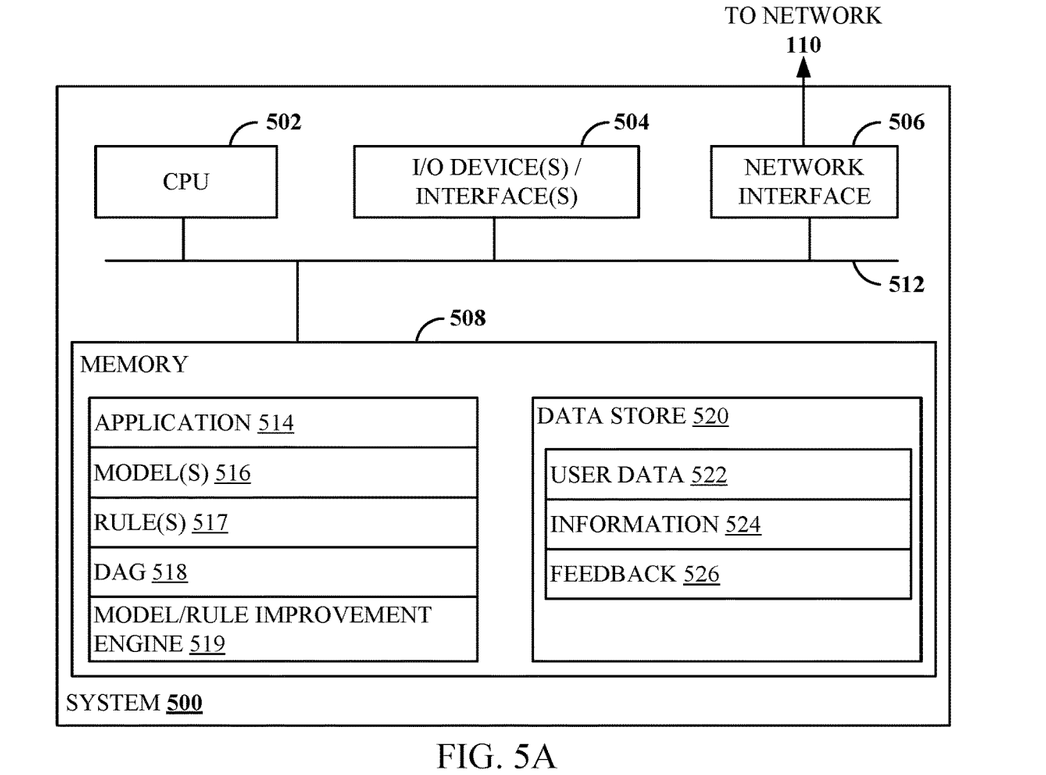
FIGS. 5A and 5B depict example processing systems for machine learning and rules integration.

FIG. 5A illustrates an example system 500 with which embodiments of the present disclosure may be implemented. For example, system 500 may be representative of server 120 of FIG. 1.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110 (e.g., which may be network 110 of FIG. 1). It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, model(s) 516, rule(s) 517, DAG 518, and model/rule improvement engine 519, which may be representative of application 122, machine learning model(s) 124, rule(s) 126, DAG 128, and model/rule improvement engine 129 of FIG. 1. Memory 508 further comprises data store 520, which may be representative of data store 140 of FIG. 1. While data store 520 is depicted in local storage of system 500, it is noted that data store 520 may also be located remotely (e.g., at a location accessible over a network, such as the Internet). Data store 520 includes user data 522, information 524, and feedback 526 which may be representative of user data 148, information 152, and feedback 154 of FIG. 1.

Figure 5B:
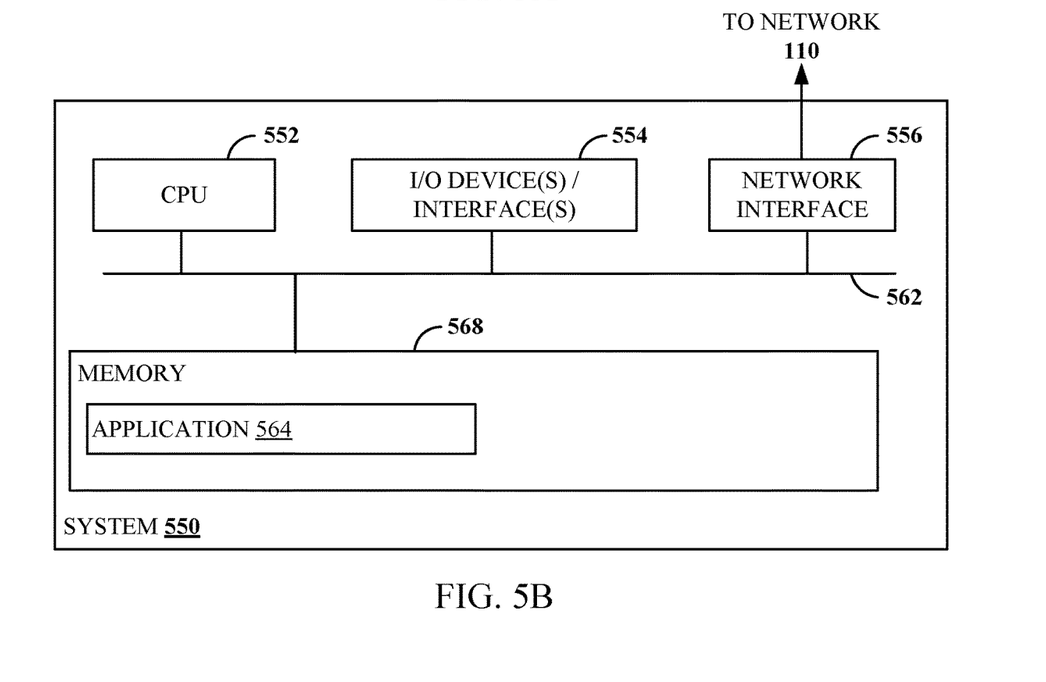

FIG. 5B illustrates another example system 550 with which embodiments of the present disclosure may be implemented. For example, system 550 may be representative of client 130 of FIG. 1.

System 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, and an interconnect 552. It is contemplated that one or more components of system 550 may be located remotely and accessed via a network 110 (e.g., which may be network 110 of FIG. 1). It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 552 transmits programming instructions and application data, among the CPU 552, I/O device interface 554, network interface 556, and memory 658. CPU 552 is included to be representative of a single CPU, multiple CPUs, a single CPU having multiple processing cores, and other arrangements.

Additionally, the memory 558 is included to be representative of a random access memory. In some embodiments, memory 558 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 558 includes an application 564, which may be representative of a client-side component corresponding to the server-side application 514 of FIG. 5A. For example, application 564 may comprise a user interface through which a user of system 550 interacts with application 514 of FIG. 5A. In alternative embodiments, application 514 is a standalone application that performs behavior prediction as described herein.

Example Clauses

Clause 1: A method for machine learning and rules integration, comprising: receiving a plurality of input values corresponding to a subset of a set of input variables associated with an automated determination, wherein the subset does not include at least one input variable from the set of input variables; generating a directed acyclic graph (DAG) representing a set of constraints corresponding to the set of input variables, wherein the set of constraints relate to: one or more machine learning models; and one or more rules; providing one or more inputs to the one or more machine learning models based on one or more input values of the plurality of input values; receiving one or more outputs from the one or more machine learning models based on the one or more inputs; determining outcomes for the one or more rules based on at least one input value of the plurality of input values; populating the DAG based on the plurality of input values, the one or more outputs from the one or more machine learning models, and the outcomes for the one or more rules; making the automated determination based on logic represented by the DAG; and performing one or more actions based on the automated determination.

Clause 2: The method of Clause 1, further comprising: receiving feedback from a user related to the automated determination; and modifying a rule of the one or more rules or a machine learning model of the one or more machine learning models based on the feedback.

Clause 3: The method of Clause 2, wherein modifying the machine learning model comprises re-training the machine learning model based on the feedback.

Clause 4: The method of any one of Clause 2-3 wherein the modifying is based on an analysis of the DAG in view of the feedback.

Clause 5: The method of Clause 4, wherein the analysis of the DAG comprises determining a root cause of an incorrect determination that is indicated by the feedback.

Clause 6: The method of any one of Clause 1-5, wherein populating the DAG comprises performing a series of iterations during which nodes of the DAG are backfilled.

Clause 7: The method of any one of Clause 1-6, further comprising forward-solving the DAG to determine: one or more values for one or more resolved inputs; and one or more ranges for one or more unresolved inputs.

Clause 8: The method of any one of Clause 1-7, wherein the DAG indicates one or more dependencies between the one or more machine learning models and the one or more rules.

Clause 9: A method for machine learning and rules integration, comprising: receiving, from a user via a user interface, a plurality of input values corresponding to a subset of a set of input variables associated with an automated determination, wherein the subset does not include at least one input variable from the set of input variables; generating a directed acyclic graph (DAG) representing a set of constraints corresponding to the set of input variables, wherein the set of constraints relate to: one or more machine learning models; and one or more rules; providing one or more inputs to the one or more machine learning models based on one or more input values of the plurality of input values; receiving one or more outputs from the one or more machine learning models based on the one or more inputs; determining outcomes for the one or more rules based on at least one input value of the plurality of input values; populating the DAG based on the plurality of input values, the one or more outputs from the one or more machine learning models, and the outcomes for the one or more rules; making the automated determination based on logic represented by the DAG; providing information for display to the user via the user interface based on the automated determination; receiving, from the user via the user interface, feedback relating to the information; and making a subsequent automated determination based on the feedback.

Clause 10: The method of Clause 9, further comprising: receiving feedback from a user related to the automated determination; and modifying a rule of the one or more rules or a machine learning model of the one or more machine learning models based on the feedback.

Clause 11: The method of Clause 10, wherein modifying the machine learning model comprises re-training the machine learning model based on the feedback.

Clause 12: The method of any one of Clause 10-11, wherein the modifying is based on an analysis of the DAG in view of the feedback.

Clause 13: The method of Clause 12, wherein the analysis of the DAG comprises determining a root cause of an incorrect determination that is indicated by the feedback.

Clause 14: The method of any one of Clause 9-13, wherein populating the DAG comprises performing a series of iterations during which nodes of the DAG are backfilled.

Clause 15: The method of any one of Clause 9-14, further comprising forward-solving the DAG to determine: one or more values for one or more resolved inputs; and one or more ranges for one or more unresolved inputs.

Clause 16: The method of any one of Clause 9-15, wherein the DAG indicates one or more dependencies between the one or more machine learning models and the one or more rules.

Clause 17: A system, comprising: one or more processors; and a memory comprising instructions that, when executed by the one or more processors, cause the system to: receive a plurality of input values corresponding to a subset of a set of input variables associated with an automated determination, wherein the subset does not include at least one input variable from the set of input variables; generate a directed acyclic graph (DAG) representing a set of constraints corresponding to the set of input variables, wherein the set of constraints relate to: one or more machine learning models; and one or more rules; provide one or more inputs to the one or more machine learning models based on one or more input values of the plurality of input values; receive one or more outputs from the one or more machine learning models based on the one or more inputs; determine outcomes for the one or more rules based on at least one input value of the plurality of input values; populate the DAG based on the plurality of input values, the one or more outputs from the one or more machine learning models, and the outcomes for the one or more rules; make the automated determination based on logic represented by the DAG; and perform one or more actions based on the automated determination.

Clause 18: The system of Clause 17, wherein the instructions, when executed by the one or more processors, further cause the system to: receive feedback from a user related to the automated determination; and modify a rule of the one or more rules or a machine learning model of the one or more machine learning models based on the feedback.

Clause 19: The system of Clause 18, wherein modifying the machine learning model comprises re-training the machine learning model based on the feedback.

Clause 20: The system of any one of Clause 18-19, wherein the modifying is based on an analysis of the DAG in view of the feedback.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for machine learning and rules integration, comprising:

receiving a plurality of input values corresponding to a subset of a set of input variables associated with an automated determination, wherein the subset does not include at least one input variable from the set of input variables;
generating a directed acyclic graph (DAG) representing a set of constraints corresponding to the set of input variables, wherein the set of constraints relate to:
one or more machine learning models; and
one or more rules;
providing one or more inputs to a subset of the one or more machine learning models based on one or more input values of the plurality of input values;
receiving one or more outputs from the subset of the one or more machine learning models based on the one or more inputs;
determining outcomes for a subset of the one or more rules based on at least one input value of the plurality of input values;
populating the DAG based on the plurality of input values, the one or more outputs from the subset of the one or more machine learning models, and the outcomes for the subset of the one or more rules;
determining not to utilize a given machine learning model of the one or more machine learning models based on logic represented by the DAG;
making the automated determination based on the logic represented by the DAG;
performing one or more actions based on the automated determination;
receiving user feedback with respect to the automated determination; and
using the DAG to identify a particular machine learning model of the one or more machine learning models to the re-trained based on the user feedback, wherein the particular machine learning model is re-trained through a supervised learning process comprising:
providing one or more training inputs to the particular machine learning model based on the plurality of input values;
receiving one or more training outputs from the particular machine learning model based on the one or more training inputs; and
iteratively modifying one or more parameters of the particular machine learning model based on the one or more training outputs and the user feedback.

2. The method of claim 1, further comprising:
modifying a rule of the one or more rules based on the user feedback.

3. The method of claim 2, wherein the modifying of the rule is based on an analysis of the DAG in view of the user feedback.

4. The method of claim 3, wherein the analysis of the DAG comprises determining a root cause of an incorrect determination that is indicated by the user feedback.

5. The method of claim 1, wherein populating the DAG comprises performing a series of iterations during which nodes of the DAG are backfilled.

6. The method of claim 1, further comprising forward-solving the DAG to determine:
one or more values for one or more resolved inputs; and
one or more ranges for one or more unresolved inputs.

7. The method of claim 1, wherein the DAG indicates one or more dependencies between the one or more machine learning models and the one or more rules.

8. A method for machine learning and rules integration, comprising:

receiving, from a user via a user interface, a plurality of input values corresponding to a subset of a set of input variables associated with an automated determination, wherein the subset does not include at least one input variable from the set of input variables;

generating a directed acyclic graph (DAG) representing a set of constraints corresponding to the set of input variables, wherein the set of constraints relate to:
one or more machine learning models; and
one or more rules;

providing one or more inputs to a subset of the one or more machine learning models based on one or more input values of the plurality of input values;

receiving one or more outputs from the subset of the one or more machine learning models based on the one or more inputs;

determining outcomes for the one or more rules based on at least one input value of the plurality of input values;

populating the DAG based on the plurality of input values, the one or more outputs from the subset of the one or more machine learning models, and the outcomes for the one or more rules;

determining not to utilize a given machine learning model of the one or more machine learning models based on logic represented by the DAG;

making the automated determination based on the logic represented by the DAG;

providing information for display to the user via the user interface based on the automated determination;

receiving, from the user via the user interface, feedback relating to the information;

using the DAG to identify a particular machine learning model of the one or more machine learning models to be re-trained based on the feedback, wherein the particular machine learning model is re-trained through a supervised learning process comprising:
providing one or more training inputs to the particular machine learning model based on the plurality of input values;
receiving one ore more training outputs from the particular machine learning model based on the one or more training inputs; and
iteratively modifying one ore more parameters of the particular machine learning model based on the one ore more training outputs and the feedback; and making a subsequent automated determination based on the re-trained particular machine learning model.

9. The method of claim 8, further comprising:
modifying a rule of the one or more rules based on the feedback.

10. The method of claim 9, wherein the modifying of the rule is based on an analysis of the DAG in view of the feedback.

11. The method of claim 10, wherein the analysis of the DAG comprises determining a root cause of an incorrect determination that is indicated by the feedback.

12. The method of claim 8, wherein populating the DAG comprises performing a series of iterations during which nodes of the DAG are backfilled.

13. The method of claim 8, further comprising forward-solving the DAG to determine:
one or more values for one or more resolved inputs; and
one or more ranges for one or more unresolved inputs.

14. The method of claim 8, wherein the DAG indicates one or more dependencies between the one or more machine learning models and the one or more rules.

15. A system, comprising:
one or more processors; and
a memory comprising instructions that, when executed by the one or more processors, cause the system to:
receive a plurality of input values corresponding to a subset of a set of input variables associated with an automated determination, wherein the subset does not include at least one input variable from the set of input variables;
generate a directed acyclic graph (DAG) representing a set of constraints corresponding to the set of input variables, wherein the set of constraints relate to:
one or more machine learning models; and
one or more rules;
provide one or more inputs to a subset of the one or more machine learning models based on one or more input values of the plurality of input values;
receive one or more outputs from the subset of the one or more machine learning models based on the one or more inputs;
determine outcomes for a subset of the one or more rules based on at least one input value of the plurality of input values;
populate the DAG based on the plurality of input values, the one or more outputs from the subset of the one or more machine learning models, and the outcomes for the subset of the one or more rules;
determine not to utilize a given machine learning model of the one or more machine learning models based on logic represented by the DAG;
make the automated determination based on the logic represented by the DAG;
perform one or more actions based on the automated determination;
receive user feedback with respect to the automated determination; and
use the DAG to identify a particular machine learning model of the one or more machine learning models to be re-trained based on the user feedback, wherein the particular machine learning model is re-trained through a supervised learning process comprising:
providing one or more training inputs to the particular machine learning model based on the plurality of input values;
receiving one ore more training outputs from the particular machine learning model based on the one or more training inputs; and
iteratively modifying one ore more parameters of the particular machine learning model based on the one or more training outputs and the user feedback.

16. The system of claim 15, wherein the instructions, when executed by the one or more processors, further cause the system to:
modify a rule of the one or more rules based on the user feedback.

17. The system of claim 16, wherein the modifying of the rule is based on an analysis of the DAG in view of the user feedback.

* * * * *